US007925561B2

(12) United States Patent
Xu

(10) Patent No.: US 7,925,561 B2
(45) Date of Patent: Apr. 12, 2011

(54) METHODS AND SYSTEMS FOR RISK MANAGEMENT

(75) Inventor: Chenjian Xu, Short Hills, NJ (US)

(73) Assignee: RealTick LLC, Chicago, IL (US)

( * ) Notice: Subject to any disclaimer, the term of this patent is extended or adjusted under 35 U.S.C. 154(b) by 545 days.

(21) Appl. No.: 11/713,512

(22) Filed: Mar. 1, 2007

(65) Prior Publication Data

US 2007/0219893 A1    Sep. 20, 2007

Related U.S. Application Data

(60) Provisional application No. 60/778,475, filed on Mar. 1, 2006.

(51) Int. Cl.
    *G06Q 40/00*    (2006.01)
(52) U.S. Cl. ............................ 705/36 R; 705/35; 705/37
(58) Field of Classification Search ............... 705/35–40
    See application file for complete search history.

(56) References Cited

U.S. PATENT DOCUMENTS

| | | | |
|---|---|---|---|
| 2003/0033240 A1* | 2/2003 | Balson et al. ................. | 705/37 |
| 2003/0083972 A1 | 5/2003 | Williams | |
| 2004/0034587 A1* | 2/2004 | Amberson et al. ............ | 705/36 |
| 2005/0004862 A1* | 1/2005 | Kirkland et al. .............. | 705/38 |
| 2005/0097027 A1* | 5/2005 | Kavanaugh .................... | 705/37 |
| 2005/0283426 A1 | 12/2005 | Krishnasami | |
| 2006/0036533 A1 | 2/2006 | Frankel et al. | |
| 2006/0277134 A1* | 12/2006 | Glinberg et al. .............. | 705/35 |

OTHER PUBLICATIONS

Yang, Jian (2006). Stochastic volatility models: Option price approximation, asymptotics and maximum likelihood estimation. Ph.D. dissertation, University of Illinois at Urbana-Champaign, United States—Illinois.*
Pactwa, Therese Ellen (2001). Using extreme value theory to value stock market returns. Ph.D. dissertation, Florida International University, United States—Florida.*
Christian L Dunis, & Yao Xian Chen. (2005). Alternative volatility models for risk management and trading: Application to the EUR/USD and USD/JPY rates. Derivatives Use, Trading & Regulation, 11(2), 126-156.*
RealTick User Manual, Townsend Analytics, Ltd., 2004, pp. 1-424.

* cited by examiner

*Primary Examiner* — Alexander Kalinowski
*Assistant Examiner* — Abhishek Vyas
(74) *Attorney, Agent, or Firm* — Morgan Lewis & Bockius LLP

(57) ABSTRACT

In one aspect, the invention comprises acquiring background data regarding securities positions and regarding real-time pricing data; performing calculations regarding intermediate measures of performance of the securities; receiving configuration data for a portfolio of securities and one or more data requests, at least one of the data requests comprising a request for a value at risk report regarding the portfolio; and providing a value at risk report based on a Parkinson's volatility estimation. In another aspect, the invention comprises displaying a tree structure display in a first portion of a graphical user interface display; in response to a user selecting an item from the tree structure display, displaying a corresponding listing in a tabular display in a second portion of the graphical user interface display; and in response to the user selecting a listing in the tabular display, displaying a corresponding item in the tree structure display.

34 Claims, 3 Drawing Sheets

METHODS AND SYSTEMS FOR RISK MANAGEMENT

CROSS REFERENCE TO RELATED APPLICATIONS

This application claims priority to U.S. Provisional Patent Application No. 60/778,475, filed Mar. 1, 2006. The entire contents of that provisional application are incorporated herein by reference.

BACKGROUND AND SUMMARY

Broker-dealers today face unique challenges in risk management. The proliferation of electronic trading has generated record numbers of traders and volume. Various risk-taking behaviors of traders complicate companies' credit policies and their risk management process. Real-time risk management software is needed to address the specific needs of today's investment companies.

Market risk has the most direct impact on a firm. Changes in the value of investment instruments directly affect the asset value of trading accounts. While most accounts are well funded, some of them may encounter situations where asset value fails to cover the risk of leverage. To deal with this problem, most firms have established credit policies via so-called margin rules, wherein accounts are classified based on their risk profiles, and assets within the accounts are appropriately margined based on a defined set of rules.

Most exchanges, clearing companies, and broker-dealers have their own margin rules clearly defined. Recently, Standard Portfolio Analysis of Risk (SPAN®) of Chicago Mercantile Exchange (www.cme.com) and Theoretical Intermarket Margin System (TIMS) of Options Clearing Corporation (www.optionsclearing.com) have gained traction in margining future contracts and options. Properly margining each account at the end of a trading day via a back-office batch process is a standard practice. However, by the time a problem has been detected by such a delayed process, significant damage may already have been done. In today's ever-changing markets, real-time detection of margin violations, cross asset types and cross multiple currencies, is needed to control the risk to the firm.

Some financial software vendors, especially those who specialize in real-time systems, have started to introduce near real-time risk management software to meet the demand for intraday risk management. Leveraging the real-time quoting and trading systems, these risk management systems scan thousands of trading accounts to compute financial measures such as asset market values, gains or losses and margin requirements, using real-time prices and trading activities. Risk reports are generated intraday based on these measures to warn risk managers of potential problems. Today's powerful hardware and modern parallel programming models deployed in software make it possible to complete such complex tasks in a very reasonable timeframe. For instance, the Credit-at-Risk (CaR) feature comprised in one aspect of the present invention is capable of delivering such reports every minute.

One of the major challenges facing such surveillance risk management systems is information overload. The vast amount of information generated by real-time data on thousands of accounts makes it impossible for risk managers to digest the important information and act quickly. Software developers have employed many concepts in traditional decision support systems (DSS) as extensions to the core surveillance capability. For example, in one aspect of the present invention, instead of furnishing full risk reports, exception reports based on user-defined criteria may be generated to report a manageable number of problematic items where risk tends to concentrate. Further analytical capabilities may be introduced via drill-down features, where users can navigate to detailed information intuitively via the items highlighted by exception reports. In many cases, the analytical capabilities themselves become extremely valuable in researching problems and recommending appropriate actions.

While risk management is becoming more and more important in the financial industry, many broker-dealers have started to demand instant responses to risk. For instance, some industry sectors are moving from a T+1 margin call policy, where margin calls are made after an end-of-day margin report, to T+0 margin call policy, where margin calls are made as soon as a margin violation is discovered. Further, in trading with highly volatile and highly leveraged instruments, such as futures and foreign exchanges, such real-time risk reporting is necessary to address a risky situation within minutes to limit losses. The availability of real-time risk management systems is a revolutionary force gradually altering how risk management desks operate at broker-dealers.

Another key risk facing broker-dealers is the risk-taking behavior of their own customers, the traders. Increasingly, professional class research and trading software, such as RealTick® (www.realtick.com), are being deployed to retail traders' desktops. These trading tools are the main contributors to today's increasingly electronic trading environment and high liquidity. Yet the impressive firepower of these trading platforms requires equally capable risk management components to regulate the trader's behavior.

Developed upon and extending the traditional approach for pre-trade risk management, real-time margining, today's margin systems embedded in the trading platform can compute margin requirements based on portfolio risk. For instance, RealTick's risk-based margin system scans traders' account positions and pending trades in real-time to compute margin requirements on current positions and pending trades, while recognizing hedged positions such as spreads and covers for margin credits. Accurate pre-trade and post-trade portfolio margins are computed based on real-time price information and are compared to determine if the account has sufficient buying power to cover proposed trades. Furthermore, special margin algorithms are applied to keep the number inline with regulatory requirements and exchange rules. In RealTick's case, instruments on the Milan Stock Exchange are margined using the TIMS method to comply with Italian regulations, while CME futures are margined according to exchange published rules, cognizant of its intra- and inter-commodity spread definitions. This capability makes it nearly impossible for traders to trade into margin call situations, while promptly adjusting their account's buying power depending on the price movements.

The combination of pre-trade risk-based margining and post-trade margin-based risk surveillance is powerful enough to address credit risk imposed by traders in most cases. However, margin rules are usually overly general, incapable of addressing the volatility of individual instruments and the correlating asset amounts. This situation makes the CaR method ineffective in addressing the firm's settlement risk and assessing the firm's capital adequacy. Broker-dealers, especially those who are self-clearing, must employ a statistical method to project such risk. The conventional method used for this purpose is Value-at-Risk (VaR).

VaR measures the worst expected loss under normal market conditions over a specific time interval at a given confidence level. Since gaining popularity in the 1990s, VaR is now widely used to report short-term market risk and to assess capital adequacy of investment companies. Today's risk management practices usually employ one of the three most popular methods for VaR reporting: variance-covariance approach, historical simulation, and Monte Carlo simulation.

One of the key features of VaR is its comparability. Given the size of a portfolio, the greater the VaR, the greater the risk, regardless of the content of the portfolio. This property enables two major applications in risk management: (1) when VaR reports are created for the same portfolio periodically, one can track the level of risk-taking over time, and (2) when VaR reports are created for a number of portfolios at the same time, risk levels of these portfolios can be compared side-by-side. By tracking firm-wide risk over time, management can obtain a strategic view of risk-taking behavior at an aggregated level. This is an important component of financial reporting, as well as of long-term risk management practices. Side-by-side comparison of portfolio risk gives risk managers a tactical tool to analyze risk distribution within an investment domain. Being able to quickly spot areas with the greatest risk concentration gives risk managers a means to act promptly to avoid damages.

The risk management software described herein has gone a step further to add analytical capabilities on top of VaR reporting. One embodiment bundles drill-down capability into its VaR reporting so that users can further examine risk for groups of stocks and options with the same underlying asset, as well as for individual positions, and rank the subsets based on risk level. With only a few clicks, a risk manager can pinpoint key areas that are riskiest to the portfolio. In many cases, what-if scenario analysis tools are also included to assist the risk manager in researching appropriate actions to mitigate risk.

Because of the computational complexity in VaR calculations, most companies use an overnight batch process to generate the reports. This practice is satisfactory for strategic control of the firm risk, but not sufficient for tactical analysis, intraday risk control, what-if studies, and risk-based trading. To enable on-demand VaR reporting, vendors employ various ways to deal with the complexity. An embodiment of the present invention employs an overnight batch process to compute intermediate risk measures, such as volatility and correlations, and real-time prices and positions are used to generate on-demand VaR reports. The practice is so effective that a ten thousand position portfolio can have its VaR computed within twenty seconds.

Many broker-dealers have started to take full advantage of technological advances in real-time risk management software. The pre-trade risk-based margin system nearly eliminates the possibility of having a trader's risk-taking behavior cause a violation of the firm's credit policy. The real-time margin-based risk surveillance makes it possible to catch credit policy violations immediately. The on-demand VaR calculation provides risk managers tools to spot risk concentration and take appropriate action to mitigate risk. After deploying such software packages, many firms see an immediate productivity gain on their risk desks. Over time, risk managers, who are relieved from repetitive routine work now handled by the software, spend more and more time solving complex problems that require human intervention. Some firms also take advantage of the analytical capability of the software to add depth to the level of service offered to their clients. The virtuous loop of lower risk, improved productivity, more intimate client service, and growing business is making risk management practice a profit generator.

In one aspect, the invention comprises a method comprising: (a) acquiring background data regarding securities positions and regarding real-time pricing data; (b) performing calculations regarding intermediate measures of performance of the securities; (c) receiving configuration data for a portfolio of securities and one or more data requests, at least one of the data requests comprising a request for a value at risk report regarding the portfolio; and (d) providing a value at risk report based on the background data, the calculations, and the configuration data, wherein the value at risk report is based on a Parkinson's volatility estimation.

In various embodiments: (1) the step of acquiring background data comprises obtaining real-time data regarding positions from one or more order management systems; (2) the step of acquiring background data comprises obtaining real-time pricing data from one or more market data services; (3) the step of acquiring background data comprises obtaining high-low volatility data based on a plurality of recent trading days; (4) the plurality of recent trading days is approximately ten days; (5) the step of performing calculations regarding intermediate measures of performance of the securities comprises computing implied volatility for options based on a Black-Scholes formula and market prices; (6) the step of performing calculations regarding intermediate measures of performance of the securities comprises computing multi-point risk arrays based on option implied volatility and stock high-low volatility; (7) the step of receiving configuration data for a portfolio of securities comprises receiving the calculated intermediate measures of performance; (8) intermediate measures of performance comprise positions, volatilities, and risk arrays; (9) the step of providing a value at risk report comprises grouping positions by underlying securities; (10) the step of providing a value at risk report comprises aggregating risk arrays; (11) the step of providing a value at risk report comprises aggregating risk arrays for futures positions within each of one or more portfolios and applying correlation coefficients; and (12) the step of providing a value at risk report comprises transmitting the report to a graphical user interface for display.

In another aspect, the invention comprises software comprising: (a) software operable to acquire background data regarding securities positions and regarding real-time pricing data; (b) software operable to perform calculations regarding intermediate measures of performance of the securities; (c) software operable to receive configuration data for a portfolio of securities and one or more data requests, at least one of the data requests comprising a request for a value at risk report regarding the portfolio; and (d) software operable to provide a value at risk report based on the background data, the calculations, and the configuration data, wherein the value at risk report is based on a Parkinson's volatility estimation.

In various embodiments: (1) the software operable to acquire background data is operable to obtain real-time data regarding positions from one or more order management systems; (2) the software operable to acquire background data is operable to obtain real-time pricing data from one or more market data services; (3) the software operable to acquire background data is operable to obtain high-low volatility data based on a plurality of recent trading days; (4) the plurality of recent trading days is approximately ten days; (5) the software operable to perform calculations regarding intermediate measures of performance of the securities is operable to compute implied volatility for options based on a Black-Scholes formula and market prices; (6) the software operable to perform calculations regarding intermediate measures of performance of the securities is operable to compute multi-point risk arrays based on option implied volatility and stock high-low volatility; (7) the software operable to receive configuration data for a portfolio of securities is operable to receive the calculated intermediate measures of performance; (8) intermediate measures of performance comprise positions, volatilities, and risk arrays; (9) the software operable to provide a value at risk report is operable to group positions by underlying securities; (10) the software operable to provide a value at risk report is operable to aggregate risk arrays; (11) the software operable to provide a value at risk report comprises aggregating risk arrays for futures positions within each of one or more portfolios and applying correlation coefficients; and (12) the software operable to provide a value at risk report is operable to transmit the report to a graphical user interface for display.

In another aspect, the invention comprises a method comprising: (a) implementing a variance-covariance model; (b) calculating a Parkinson's volatility approximation with intra-day adjustments; (c) performing a periodic batch option revaluation based on a Black-Scholes model; (d) modeling a multi-point risk array for intermediate measures of theoretical prices; (e) estimating correlations based on a multivariate model; (f) implementing quadratic regression for delta/gamma estimation; and (g) generating a value at risk report.

In various embodiments: (1) for each of one or more positions in the portfolio, one or more elements of a corresponding risk array are computed based on a product of price, volume, and risk array elements for the security in which the position is held; (2) quadratic regression is performed on data points derived at least in part from the risk array; (3) values of securities in the portfolio are assumed to be log normally distributed; (4) derivatives in the portfolio are assumed to be non-linearly distributed; (5) zero correlation is assumed among assets in different asset classes; (6) correlation of 0.5 is assumed among assets within an asset class; (7) high correlation is assumed for assets with the same underliers; (8) the value at risk report comprises three levels: portfolio, underlier group, and position; and (9) a $\sqrt{T}$ rule is used to estimate daily volatility intraday.

In another aspect, the invention comprises software comprising: (a) software operable to implement a variance-covariance model; (b) software operable to calculate a Parkinson's volatility approximation with intra-day adjustments; (c) software operable to perform periodic batch option revaluation based on a Black-Scholes model; (d) software operable to model a multi-point risk array for intermediate measures of theoretical prices; (e) software operable to estimate correlations based on a multivariate model; (f) software operable to implement quadratic regression for delta/gamma estimation; and (g) software operable to generate a value at risk report.

In various embodiments: (1) for each of one or more positions in the portfolio, one or more elements of a corresponding risk array are computed based on a product of price, volume, and risk array elements for the security in which the position is held; (2) quadratic regression is performed on data points derived at least in part from the risk array; (3) values of securities in the portfolio are assumed to be log normally distributed; (4) derivatives in the portfolio are assumed to be non-linearly distributed; (5) zero correlation is assumed among assets in different asset classes; (6) correlation of 0.5 is assumed among assets within an asset class; (7) high correlation is assumed for assets with the same underliers; (8) the value at risk report comprises three levels: portfolio, underlier group, and position; and (9) a $\sqrt{T}$ rule is used to estimate daily volatility intraday.

In another aspect, the invention comprises software comprising: (a) software for displaying a first portion of a graphical user interface display comprising a tree structure display; and (b) software for displaying a second portion of a graphical user interface display comprising a tabular display, wherein one or more items in the tree structure display, when selected by a user, each have corresponding listings displayed in the tabular display, and wherein one or more of the listings in the tabular display, when selected by a user, each causes a corresponding item in the tree structure to be displayed.

In various embodiments: (1) items in the tree structure display are selected using checkboxes; (2) listings in the tabular display are selected using highlighting; (3) the tree structure display represents a multi-level hierarchy; (4) for each of one or more selected items in the tree structure display, a corresponding listing in the tabular display comprises hierarchical properties of the one or more selected items in the tree structure display; (5) at least one level of the hierarchy corresponds to one or more banks; and (6) one or more items in the tree structure corresponds to an account.

In another aspect, the invention comprises a method comprising: (a) displaying a tree structure display in a first portion of a graphical user interface display; (b) in response to a user selecting an item from the tree structure display, displaying a corresponding listing in a tabular display in a second portion of the graphical user interface display; and (c) in response to the user selecting a listing in the tabular display, displaying a corresponding item in the tree structure display.

In various embodiments: (1) items in the tree structure display are selected using checkboxes; (2) listings in the tabular display are selected using highlighting; (3) the tree structure display represents a multi-level hierarchy; (4) for each of one or more selected items in the tree structure display, a corresponding listing in the tabular display comprises hierarchical properties of the one or more selected items in the tree structure display; (5) at least one level of the hierarchy corresponds to one or more banks; (6) one or more items in the tree structure corresponds to an account.

In another aspect, the invention comprises a method comprising: (a) computing one or more net asset values for an account based on a broker-dealer's margin rule settings; (b) computing one or more margin requirements for the account based on the margin rule settings; (c) computing account buying power based on the one or more margin requirements and one or more net liquidation values; and (d) displaying on an account summary screen computed results for the one or more net asset values, the one or more margin requirements, and the account buying power.

In another aspect, the invention comprises: (a) software operable to compute one or more net asset values for an account based on a broker-dealer's margin rule settings; (b) software operable to compute one or more margin requirements for the account based on the margin rule settings; (c) software operable to compute account buying power based on the one or more margin requirements and one or more net liquidation values; and (d) software operable to display on an account summary screen computed results for the one or more net asset values, the one or more margin requirements, and the account buying power.

DETAILED DESCRIPTION

Risk Manager Software

Figure 1:
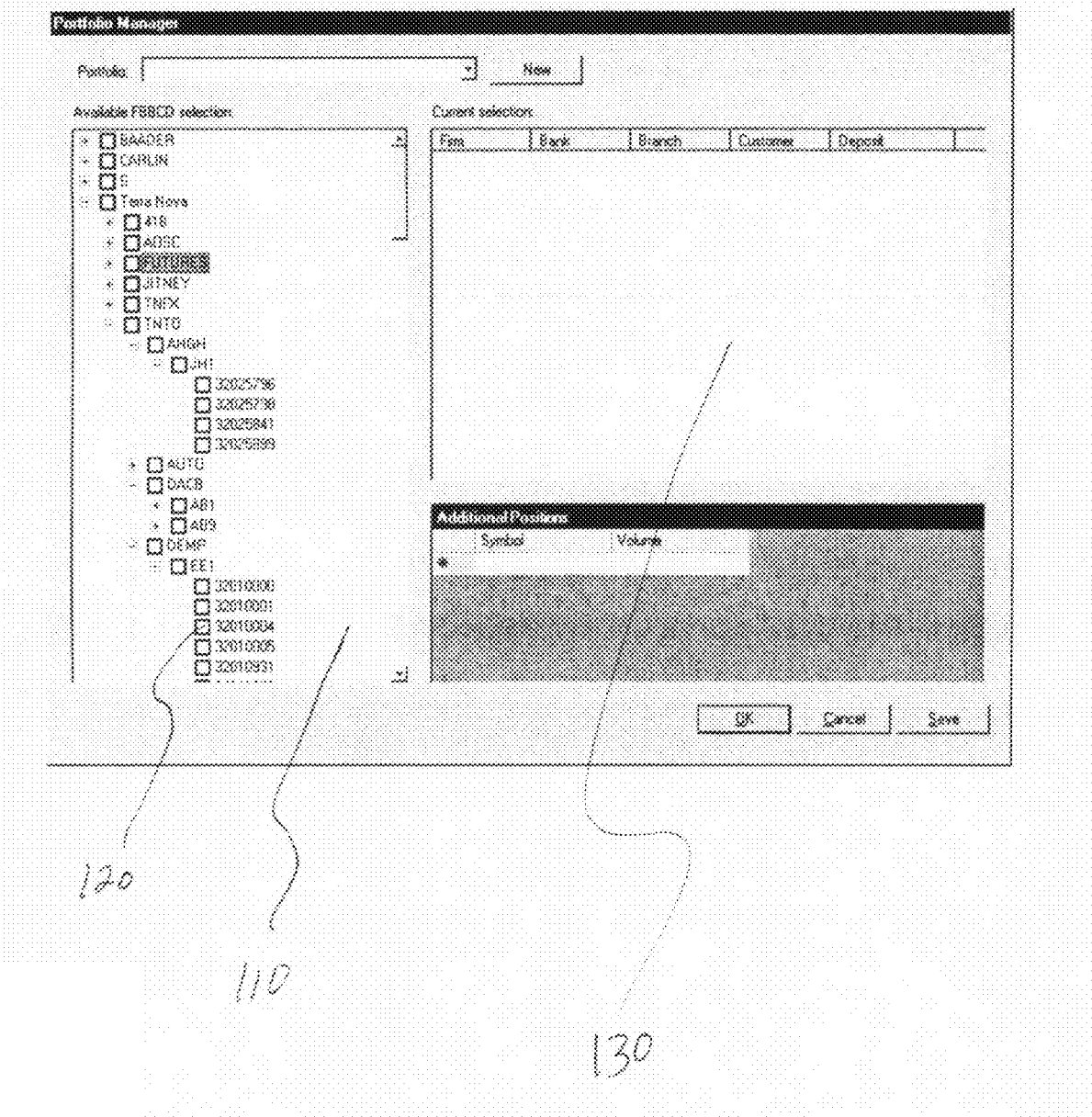
FIG. 1 depicts a preferred graphical user interface (GUI) for tree structure navigation.

In one aspect, the present invention comprises Risk Manager software that preferably has two major components: Credit at Risk (CaR) and Value at Risk (VaR).

VaR is a software component whose user interface portion resides in Risk Analyzer (the client) and whose analytics portion resides in RiskEngine (the server). It pulls intermediate measures out of the RiskEngine onto a user's desktop, computes the final measures, and displays a report based on the user's selection criteria.

CaR is a near real-time reporting tool that monitors broker account credit risk—for example, CaR preferably computes net asset value and margin requirement on each account based on a broker dealer's margin rule settings; derives account buying power; and warns risk managers when an account violates the broker dealer's credit policy. If the account user violates the broker dealer's margin rules severely, the risk manager may use margin calls and/or forced liquidation.

In an embodiment, the VaR implementation of one aspect of the present invention is real-time, while prior art VaR implementations are overnight batch jobs. To enable real-time responses, the VaR embodiment preferably uses a variance-covariance model, Parkinson's volatility approximation with intraday adjustments, every-minute batch option revaluation based on Black Scholes model, a 19-point risk array for intermediate measures for theoretical prices, a multivariate model to estimate correlations, and quadratic regression for Delta/Gamma estimation.

In one aspect, the invention comprises stages of: (1) background data acquisition; (2) pre-calculation for intermediate measures; (3) client request and data loading; and (4) report creation.

Background data acquisition, in certain embodiments, comprises the following steps: (a) Risk Manager connects with order managements systems to maintain data regarding real-time positions; (b) Risk Manager connects with market data services to obtain real-time pricing data for all security types; and (c) Risk Manager loads high-low volatility data based on past 10 days' data.

Pre-calculation for intermediate measures, in certain embodiments, comprises the following steps: (a) use a Black-Scholes formula and market prices to compute implied volatility and Greeks for options; and (b) use option implied volatility and stock high-low volatility to compute 19-point risk arrays.

Client request and data loading, in certain embodiments, comprises the following steps: (a) client configures portfolios using Portfolio Manager and upload to server; (b) client requests VaR report; and (c) intermediate measures (e.g., positions, volatilities, and risk arrays) are received by Risk Analyzer.

Report creation, in certain embodiments; comprises the following steps: (a) positions are grouped by underlying securities and risk arrays are aggregated; (b) risk arrays are future aggregated across portfolio and correlation coefficients are applied; (c) final measures are computed; and (d) the report is sent to the user interface.

More details on the above and other embodiments are provided below. The embodiments described herein are intended to be exemplary only. It is not believed to be possible or practical to describe every embodiment encompassed by the invention. Those skilled in the art will recognize that many other embodiments, not described herein, are encompassed by the invention and within the scope of the appended claims.

Prior art methodologies include:

1) Historical and Monte Carlo simulations, which are more time consuming than variance-covariance models.

2) Historical volatility, which is based on time consuming regression analysis, and is incapable of intraday correction.

3) Binomial option pricing model, which is more time consuming than Black Scholes.

4) On-demand option revaluation, which has higher resource requirements than storing risk arrays.

5) Pair-wise correlation coefficient matrix, which is 1000 times more resource consuming than multivariate models.

6) Weighted average on Delta, which is less accurate than quadratic regression.

A Risk-based Margin embodiment is real-time, while prior art products are overnight batch jobs. An implementation takes an active approach in order to identify hedged positions to improve performance. This approach takes full advantage of the real-time trading and pricing infrastructure built for the RealTick system, and works as well for systems with similar features.

Competing products tend to be stand alone products, which have problems taking advantage of a real-time quoting and trading system.

The term "VaR" is used herein to refer to both the concept described below and to inventive software that calculates and uses that concept.

Value at Risk (VaR) is a projected (with a certain level of probability) amount of money a financial portfolio may lose over a period of time. For instance, ($100, 1 day, 95%) means a portfolio has a 95% chance of NOT losing more than $100 during a 1 day period.

In the United States, the 1-day 95% standard is published by RiskMetrics™. In Europe, a more conservative 10-day 99% standard is published by the BASLE Committee on Banking Supervision. Software of an embodiment of the present invention, referred to herein for convenience as "Risk Manager," provides both measures, as well as two more intermediate levels, 1-day 99% and 10-day 95%. Any VaR reporting is based on historical data, thus its forecast is always considered valid under "normal circumstances."

Real-Time Price

Overnight positions supplied by clearing companies via morning files preferably are uploaded to a Risk Database every trading day, prior to market open, by MFImporter. Trade executions are uploaded to the Risk Database by the TradeStuffer process near real-time. The server component of Risk Manager, RiskEngine, queries the Risk Database for a list of securities and queries price servers to obtain real-time price information as well as additional attributes.

Having near real-time price loads is not only an important feature for reporting equity risk, but also an essential element of estimating theoretical prices for derivatives. The system assumes a semistrong form of market efficiency, which means that all public information is reflected in the pricing of the assets. Thus, it uses the real-time prices to estimate hard-to-obtain economic measures, such as the risk-free interest rate and implied volatility of options underliers.

Volatility Estimation

The primary historical data required to compute VaR is the historical volatility information for each security. Many methods are used in the industry to estimate volatility. The most popular methods include the Simple Moving Average (SMA), Exponentially Weighted Moving Average (EWMA), and the more general GARCH method. Preferably, Risk Manager uses Parkinson's High-Low Range Volatility as its primary estimation method.

Parkinson's Method

The Parkinson number, or High-Low Range Volatility, developed by the physicist Michael Parkinson in 1980, aims to estimate the volatility of returns for a random walk, using the high and low in any particular period. Parkinson's volatility number is computed as follows, where $H_t$ is the period high and $L_t$ is the period low (t being the period).

$$V = \sqrt{\frac{\frac{1}{4\ln 2}\sum_{t=1}^{n}\left(\ln\frac{H_t}{L_t}\right)^2}{n}}$$

V, Parkinson's Volatility, is an estimate of standard deviation of the rate of return on a particular security. The rate of return, R, is a continuously compound rate for the period defined as follows, where $P_1$ is the closing price in period 1, and $P_0$ is the closing price for the previous period. n is the total number of observations, and t=0, 1, 3, ..., n are individual observations.

$$R = \ln\frac{P_1}{P_0}$$

Parkinson showed that the extreme value method is far superior to the traditional method and much more sensitive to variations of dispersion. Using the Parkinson method to estimate volatility can be of particular importance in studies of time and price dependence on volatility, as less data is needed to derive a given accuracy compared to the much larger amount of data required when using regression-based traditional methods.

Intraday Estimates

The Risk Manager standardizes all rates of return to a compounded daily percentage. Since volatility is a measure of the daily rate of return based on daily highs and lows, during the trading day, this number can only be estimated. RiskEngine will start its estimates one hour after trading begins on the security to minimize impact of random factors in the marketplace. The estimation formula is as follows: H and L are high and low, $T_D$ is the total time of the trading day, and $T_0$ is the time period that has lapsed since the security started its trading for the day.

$$V = \sqrt{\frac{T_D}{T_0}}\frac{1}{2\sqrt{\ln 2}}\ln\frac{H}{L}$$

Intuitively, this method computes the Parkinson's Volatility using the high and low of the trading hours. Then, it applies a "$\sqrt{T}$ rule" to estimate the volatility of the trading day, assuming asset prices are log-normally distributed and serial independent.

Historical Average

The intraday estimate captures the volatility during the trading hours, yet contains significant abnormal short-term volatilities, such as those associated with information dispersion. To address this problem, the Risk Database keeps 10 to 15 trading days of Parkinson's Volatility as history. The squared average for the past trading days and intraday number is the final volatility number being used by the application. The following formula is used to compute squared average, where $V_t$ are daily Parkinson's volatilities.

$$V = \sqrt{\frac{\sum_{i=1}^{n} V_i^2}{n}}$$

Other Economic Measures

While theoretical values of stocks, bonds, and futures may be computed using volatility data, derivatives require non-linear models, including Black-Scholes and pseudo-American. Thus, other economic measures, such as risk free interest rates and underlier volatility, must be estimated. Risk Manager preferably uses 5% as the risk free interest rate, regardless of the holding period, in order to simplify the process, but it can be adjusted as needed. The underlier volatility is estimated using a Black-Scholes model (i.e., Newton-Raphson estimation for implied volatility). The detailed process is explained in the Risk Array for Derivatives section below.

Intermediate Measures

The VaR calculation is computationally intensive, especially when derivatives are involved. There are several approaches on the market that make the process manageable. Some systems, such as RiskMetrics™, use delta-gamma estimation to compute option theoretical values. The drawback is that the method can deal only with situations when underlier movement is relatively small, thus undervaluing the risk on derivatives on volatile securities. SPAN and TIMS, on the other hand, use a full valuation model, which is the most resource consuming. To limit the burden on user systems, they conduct most of the complex computations on the server side in an overnight batch job and store the resulting theoretical prices based on different scenarios in Risk Arrays. This way, client desktops only need to act as reporting tools that apply basic arithmetic to the Risk Arrays to form final reports. Risk manager preferably uses a method similar to those of SPAN and TIMS for options valuation, but it improves and expands on that approach by estimating intraday volatility and conducting Risk Array computations every two minutes, due in large part to the advantages of using Parkinson's method.

When an account is flagged as TIMS-compliant, Risk Manager preferably triggers a calculation that applies TIMS methodology, using an extension library to the above-described software, which in an embodiment is part of the server side of Risk Analyzer.

Risk Array for Fundamental Assets

The Risk Array preferably stores price indices relative to the current trading price in a 19 element array. The middle position is 1, representing the current price itself, and other positions are theoretical prices as a ratio to the current price based on different scenarios. Table 1 illustrates a Risk Array for a stock. Since volatility is the standard deviation of return, we use the standard deviation symbol σ to represent volatility.

TABLE 1

| Position | Value = $e^{z\sigma}$ | Volatility (σ) | Z | Probability |
|---|---|---|---|---|
| −9 | 0.832 | 2.5% | −7.36 | 10 day 1% |
| −8 | 0.878 | 2.5% | −5.22 | 10 day 5% |
| −7 | 0.916 | 2.5% | −3.49 | |
| −6 | 0.943 | 2.5% | −2.33 | 1 day 1% |
| −5 | 0.960 | 2.5% | −1.65 | 1 day 5% |
| −4 | 0.974 | 2.5% | −1.05 | |
| −3 | 0.984 | 2.5% | −0.65 | |
| −2 | 0.990 | 2.5% | −0.4 | |
| −1 | 0.994 | 2.5% | −0.25 | |
| 0 | 1.000 | 2.5% | 0 | |
| 1 | 1.006 | 2.5% | 0.25 | |

TABLE 1-continued

| Position | Value = $e^{z\sigma}$ | Volatility ($\sigma$) | Z | Probability |
|---|---|---|---|---|
| 2 | 1.010 | 2.5% | 0.4 | |
| 3 | 1.016 | 2.5% | 0.65 | |
| 4 | 1.027 | 2.5% | 1.05 | |
| 5 | 1.042 | 2.5% | 1.65 | 1 day 95% |
| 6 | 1.060 | 2.5% | 2.33 | 1 day 99% |
| 7 | 1.091 | 2.5% | 3.49 | |
| 8 | 1.139 | 2.5% | 5.22 | 10 day 95% |
| 9 | 1.202 | 2.5% | 7.36 | 10 day 99% |

In the above example, we assume the stock has a daily volatility of 2.5%, and Z is the standard normal random variable. At position −5, for instance, the theoretical value of the stock is 0.96 times current price. Since Z=−1.65 at this point, there is a N(Z<−1.65)=5% chance that the stock value will be below this number, where N(x) is the standard normal cumulative distribution.

For a 1 day forecast, positions −6 to 6 are sufficient. However, when we need to expand the forecast to 10 days, we need to apply the $\sqrt{T}$ rule (i.e., $\sigma_{10} = \sqrt{T}\sigma$, where T=10). Since Value=$e^{z\sigma}$, this is equivalent to applying the $\sqrt{T}$ rule to Z. Thus, for a 10 day forecast, positions −9, −8, and 9 are used.

Risk Array for Derivatives

Risk Arrays for derivatives preferably have the same format as those of stocks. Table 2 shows a Risk Array for an option.

TABLE 2

| Position | Value = $e^{z\sigma}$ | Volatility ($\sigma$) | Z | Probability |
|---|---|---|---|---|
| −9 | 0.113 | 1.24% | −7.36 | 10 day 1% |
| −8 | 0.239 | 1.24% | −5.22 | 10 day 5% |
| −7 | 0.407 | 1.24% | −3.49 | |
| −6 | 0.562 | 1.24% | −2.33 | 1 day 1% |
| −5 | 0.671 | 1.24% | −1.65 | 1 day 5% |
| −4 | 0.778 | 1.24% | −1.05 | |
| −3 | 0.856 | 1.24% | −0.65 | |
| −2 | 0.907 | 1.24% | −0.4 | |
| −1 | 0.939 | 1.24% | −0.25 | |
| 0 | 1.000 | 1.24% | 0 | |
| 1 | 1.050 | 1.24% | 0.25 | |
| 2 | 1.085 | 1.24% | 0.4 | |
| 3 | 1.144 | 1.24% | 0.65 | |
| 4 | 1.244 | 1.24% | 1.05 | |
| 5 | 1.403 | 1.24% | 1.65 | 1 day 95% |
| 6 | 1.596 | 1.24% | 2.33 | 1 day 99% |
| 7 | 1.959 | 1.24% | 3.49 | |
| 8 | 2.569 | 1.24% | 5.22 | 10 day 95% |
| 9 | 3.419 | 1.24% | 7.36 | 10 day 99% |

The key difference is that Volatility and Z are now for the underliers rather than the derivatives themselves. The values preferably are now based on a more complex Black-Scholes model, which makes them non-linear.

Let's assume the Black-Scholes model has the following form, where P=Option Price, $P_u$=Underlier Price, $R_f$=Risk Free Interest Rate, T=Time to Expiration, and V=Underlier Volatility:

$$P = BS(P_u, R_f, T, V)$$

The system first uses Current Option Price to solve for Implied Volatility ($V_0$) using Newton-Raphson estimation. Then it computes the Risk Array for the option, where i=−9, −8, ..., 0, ..., 8, 9, and $R_{ui}$ is the Risk Array for the underlier:

$$R_i = \frac{BS(P_u R_{ui}, R_f, T, V)}{P_u}$$

The simulated price index points now carry exactly the same probability as those of the underliers, representing perfect correlation. This allows us to easily construct the market value Risk Arrays for a group of positions with the same underlier.

Greeks

The following Greeks preferably are computed for each option, while their definitions are extended to cover all securities.

Delta: Change of option price per unit value change of the underlier. It is the first derivative of the Black Scholes formula.

Gamma: Change of Delta per unit value change of the underlier. This is the second derivative of the Black Scholes formula.

Vega: Change of option price per percentage change of the underlier's annualized volatility.

Theta: Change of option price per day reduction in time-to-expiration.

Lambda: Percentage change of option price per percent change in underlier value.

These Greeks are computed and reported to users. Delta and Lambda are available for aggregation to a group of assets with the same underlier (i.e., the "Underlier Group").

Value at Risk Measures

VaR for Underlier Group

For each position in a portfolio, a Market Value Risk Array preferably is computed as follows, where $R_i$ is the Risk Array for the security and $mv_i$ is Market Value:

$$mv_i = price \cdot volume \cdot R_i$$

Then a portfolio is first divided into Underlier Groups (groups of positions that have the same underlier). A Market Value Risk Array then is aggregated as follows:

$$UMV_i = \Sigma mv_i$$

Intuitively, since all positions in an underlier group have the same underlier, their market value movements are perfectly correlated. Since each position of the Risk Array represents one possible scenario of underlier movement, the Underlier Group Market Value Risk Array contains the possible market value of the group for each scenario. The Z value and the cumulative probability of each scenario is exactly the same as the Risk Array of the underlier. Therefore, for the underlier group, VaR 1 Day 95%=MIN($UMV$[−5, −4, ..., 4,5])−$UMV$[0]

VaR 1 Day 99%=MIN($UMV$[−6, −5, ..., 5,6])−$UMV$[0]

VaR 10 Day 95%=MIN($UMV$[−8, −7, ..., 7,8])−$UMV$[0]

VaR 10 Day 99%=MIN($UMV$[−9, −8, ..., 8, 9])−$UMV$[0]

In the meantime, the simulated 18 scenarios allow us to estimate two other important risk measures, the Delta and the Lambda (elasticity), for the underlier group.

We take the middle three data points (UMV−1, PR−1), (UMV$_0$, PR$_0$) and (UMV$_1$, PR$_1$) to conduct a quadratic regression: UMV(PR)=aPR$^2$+bPR+c, and thus, $$a = \frac{UMV_0(PR_1 - PR_{-1}) + UMV_{-1}(PR_0 - PR_1) + UMV_1(PR_{-1} - PR_0)}{(PR_0 - PR_{-1})(PR_0 - PR_1)(PR_1 - PR_{-1})}$$

and $$b = \frac{UMV_0 - UMV_{-1}}{PR_0 - PR_{-1}} - a(PR_0 + PR_{-1})$$

Delta is the first derivative, or the slope, at current market value $UMV_0$. Therefore, $$delta_u = \frac{dUMV}{dPR} = 2aPR_0 + b$$

The following risks in underlier groups are addressed by provision of the above measures:

TABLE 3

| Type of Risk | Measure | Remedy |
|---|---|---|
| Volatility | Volatility: standard deviation of annualized continuously compound underlier price change | Hedge with derivatives |
| Sensitivity | Delta: market value change per $1 underlier price change Lambda: percentage market change per 1% underlier price change | Hedge with option spreads |
| Concentration | Market Value as a percentage of the portfolio | Diversification |
| Overall | VaR | All of above |

VaR for Portfolio

There is no perfect way to aggregate VaR to a portfolio, especially when the portfolio contains multiple types of assets and derivatives. Risk Manager preferably makes the following assumptions during its aggregation process.

TABLE 4

| Assumption | Implication | Remedy |
|---|---|---|
| Moderately diversified | Stock values are log normally distributed, while derivatives are non-linearly distributed. The value of an aggregated portfolio, if fairly diversified, should be normally distributed. | If a portfolio is not diversified or its non delta-normal component weighted heavily, examining key underlier groups is required. |
| Average correlation | Among different asset classes, zero correlation is assumed. Within the same asset class, a correlation coefficient of 0.5 is used. Assets with the same underliers and futures with the same root symbol are considered highly/perfected correlated. | Same as above. |

The system preferably first uses Underlier Group Market Value Risk Arrays to estimate standard deviations by applying the following formula, where $P(x)$ is the probability of value x and u is the arithmetic average:

$$\sigma = \sqrt{\sum P(x_i)(x_i - u)^2} = \sqrt{\sum P(x_i)x_i^2 - u^2}$$

Since we assume that the portfolio is diversified, market value of the portfolio, as the sum of market values of all underlier groups, is normally distributed. Therefore, the standard deviation of the portfolio market value is calculated as follows, where $\delta_i$ is the standard deviation of an underlier group market value and $\rho_i$ is the correlation coefficient between underlier group i and j:

$$\sigma = \sqrt{\sum_{i=1}^{n} \sum_{j=1}^{n} \sigma_i \sigma_j \rho_{ij}}$$

Thus, VaR values are computed as follows based on an assumption of normal distribution of the portfolio market value:

VaR 1 Day 95%=1.65σ

VaR 1 Day 99%=2.33σ

VaR 10 Day 95%=1.65√10σ

VaR 10 Day 99%=2.33√10σ

To assist users in comparing portfolio risk levels, the system also provides VaR as a percentage of the portfolio net asset value, which includes cash equivalents in the portfolio.

Reporting

Although VaR calculation is a complex process, the reporting of VaR preferably is based on simple spreadsheet-like data grids. Users have the freedom to arbitrarily define portfolios, choose VaR measure sets, and navigate through the reporting hierarchy.

Arbitrary Portfolio Definition

A portfolio, generally defined, is a set of investment assets. To assist the user with efficiently creating specific portfolios, the Risk Manager preferably provides a Portfolio Manager feature. It allows users to arbitrarily create portfolios that tie into a Firm-Bank-Branch-Customer-Deposit hierarchy. It also offers the flexibility to add a user's own positions, which also can be used as a tool to analyze what-if scenarios associated with VaR reporting. A VaR report may contain multiple portfolios, allowing users to compare risk exposures on different portfolios or to create hypothetical portfolios to assess impact of certain trading activities.

Reporting Hierarchy

A VaR report has three levels: portfolio, underlier group, and position. The report is presented in a spreadsheet format, while users can navigate through the reporting hierarchy. More details on a preferred GUI are provided below.

Market Efficiency and Normality of Rate of Return

Certain levels of market efficiency are assumed in the design philosophy.

1. It is assumed that the fundamental securities, such as stocks, bonds, foreign exchanges, and futures exhibit a random walk, with a short-term growth expectation of 0. Thus, prices of these fundamental securities exhibit a log normal (delta-normal) distribution.

2. It is assumed that the price movement is serial independent in the short-term (i.e., the time autocorrelation approaches 0). Therefore, the rate of return on these securities are independently identically normally distributed (iind).

3. It is assumed that the prices of derivatives fully capture market expectation on holding cost (risk free interest rates), underlier volatility during the holding period, and rationality of time premium (no early exercise). Thus, a Black-Scholes model is valid for computing theoretical values of derivatives.

All of the above assumptions are commonly made by industry practitioners and academia.

Square-Root T Rule

The term "$\sqrt{T}$" rule refers to the following: Given $\delta$ as the standard deviation of an identical independent random variable, the sum of the T experiments have a standard deviation of $\sqrt{T}\sigma$. In a time series, if $\sigma$ is the standard deviation for one period, and assuming iid, $\sqrt{T}\sigma$ is the standard deviation of T periods.

The $\sqrt{T}$ rule is preferably used in several ways in Risk Manager. It is used to estimate daily volatility intraday. For instance, for an 8 hour trading day, if on hour 5 we observe a volatility of V, we project the whole day volatility to be $\sqrt{8/5}V$. When we report the annualized volatility, we use $\sqrt{225}V$, where V is the daily volatility (there are typically 225 trading days per year). And finally, we use $\sqrt{10}V$ as 10 day volatility for VaR calculations, and to estimate 10 day standard deviation of portfolio market value, where V is the daily volatility and $\delta$ is the daily standard deviation of portfolio market value.

Short-term time series for financial securities have a very low autocorrelation. Thus, the $\sqrt{T}$ rule provides an excellent approximation. However, long-term autocorrelations of time series on financial securities are much larger. Therefore, a $\sqrt{T}$ rule may result in significant error for a long time horizon.

The annualized volatility $\sqrt{225}V$ does not suffer from such problems because the V we use is a square average of 10-15 trading days. A horizon of 20-30 time periods is considered a short-term time series.

Correlation of Assets

The Risk Manager system preferably does not carry correlation values for any asset classes. The correlation computation is purely rule based.

1. Derivatives with the same underlier and the underlier itself are perfectly correlated. This is the basis of Risk Array computation. This assumption is made due to the fact that an underlier's price movement is the dominant factor for its derivative's price movement. This is a strong assumption, however, since in reality derivative prices are also influenced by interest rates, expectation of volatility, and sometimes, liquidity.

2. Correlation coefficients between securities in the same asset (class, i.e., stock vs. stock and bond vs. bond), are estimated at 0.5. Studies show that the vast majority of the correlation is between 0.4 and 0.7. They also show that the market value standard deviation of a moderately diversified portfolio is not very sensitive to the correlation coefficients, especially when a portfolio is reasonably diversified. In an embodiment, this strong assumption is made to maintain a reasonable level of system performance. Those skilled in the art will recognize that the invention is not limited to a correlation of 0.5. Indeed, one could use a correlation coefficient matrix without deviating from the present invention or the scope of the appended claims.

3. Correlation coefficients between futures contracts with the same root are assumed to be 0.95. Futures contract value is influenced by both its underlying commodity and interest rates, but the commodity value dominates the influence. The forward interest rates between the holding periods of two futures contract also influence the prices. The strong assumption is made that underlying commodity price movement has 95% of the influence on a futures contract.

4. Zero correlation is assumed for securities in different asset classes. For most cases, this assumption is reasonable. However, in some cases there is a high correlation (for instance, an S&P Mini futures contract has a very high correlation with an S&P based index fund and statistically significant correlation with any stocks). Preferably, Risk Manager does not recognize such correlations and will treat them as independent assets.

Diversification of Portfolio

Most of the strong assumptions made in Risk Manager's VaR calculation are insignificant in a fairly diversified portfolio. A portfolio is more diversified when:
Investments are in multiple securities
Investment are in multiple industry sectors
Investment are in multiple asset classes
Investments include both long and short positions
Investments include futures or derivatives for hedging purposes In most cases, if the portfolio holds positions in more than 8 non-correlated sectors, the portfolio is considered moderately diversified.

If, the portfolio is less than moderately diversified, underlier groups within the portfolio should be individually examined. The underlier groups that create the most VaR within the portfolio should be scrutinized. We recommend against the use of portfolio VaR on a non-diversified portfolio to assess overall risk.

The following description *"Credit Risk Based Margin in RealTick"* describes a software component which preferably is part of the server side (RiskEngine) of the Risk Analyzer. RealTick may use it to conduct real-time pre-trade margin calculation on the user's trading account. RiskEngine preferably uses it to periodically compute margin requirements on over 20,000 trading accounts and flags risky accounts based on the calculations.

An embodiment comprises a margin engine with the following characteristics:

1. Pre-trade: blocks risky behavior preemptively.
2. Real-time: uses real-time data to assess risk.
3. Portfolio-based: examines the entire portfolio (account) to determine credit worthiness and margin requirements.
4. Cross security types: handles portfolios with mixed investment vehicles (cash equivalents, stocks, indexes, mutual funds, bonds, futures, options, FX, etc.).
5. Currency aware: margins securities traded in different exchanges/currencies.

Risk-Based Margining

Measures

The preferred measure used for risk-based margining is real-time Buying Power:
Buying Power=Net Liquidation Value−Margin Requirements
Net Liquidation Value=Cash Trade Day Balance+Net Market Value for Investments
Margin Requirements=Initial Margin Requirements for Day Positions+Maintenance Margin Requirements for Overnight Positions Real-time Net Liquidation Value, portfolio Margin Requirements, portfolio Buying Power, and incremental Margin Requirements are computed for incoming orders. An embodiment will report an account's real-time net liquidation value (RISK_NET_LIQ), real-time margin requirements on current positions (RISK_MARGIN_REQ), real-time margin requirement including pending orders (RISK_MARGIN_REQ_PENDING), and real-time buying power (RISK_EXCESS_EQUITY) via an Account Summary screen. Should a trade be rejected due to insufficient buying power, a message box will be displayed to notify a user of the trade rejection.

Margin Rules

Account Manager Pro (AMPro) and Web Account Manager (WAM) provide GUI and batch update methods to set up margin rules for their accounts. See AMPro & WAM User Manuals. Note that a separate feature, Suitability Rules, such as not allowing short, naked, etc. for specific accounts, supersedes margin rules.

Currently, AMPro is used by TAL supporting staff, while WAM is used by broker dealers. The functionality of the two applications is very similar, but there are subtle differences. Certain intraday changes to the margin rules must be conducted by TAL staff upon request. Broker dealers must work with TAL staff to determine proper protocols and procedures to handle such cases.

An embodiment obtains the margin rule setup from AMPro and pass it on to a Margin Engine to compute appropriate margin requirements based on these rules.

The margin rule features preferably are as follows:
1. Group rules in Margin Rule Sets and assign them to accounts.
2. Can be based on security types.
3. Can be based on symbols.
4. Can be based on symbol wildcard pattern matching: /ESH5 and /ESM5 can both match to /ES*, for example.
5. For equities and futures: initial long, initial short, maintenance long, maintenance short and cut-off price for marginable stock.
6. For municipal and corporate bonds: market value percent and face value percent; for government bonds: long-term bond percent and short term percent.
7. For options: underlier percent, and underlier minimum percent for deeply out of money options.
8. Each margin rule can be a percentage of the market value or a fixed amount.
9. Optional enhancement: currency (may be overwritten by quote currency).

Margin Requirements

The following investment types preferably are supported for margining:

Cash Equivalents:
1. Money market funds—typically treated as cash.
2. Foreign Exchange (spot)—typically 2-10% of margin.

Bonds:
1. Government bonds—typically 5% of face for short term and 10% for long term.
2. Municipal bonds—typically 15% of market value or 10% of face, whichever is higher.
3. Corporate bonds—typically 30% of market value or 15% of face, whichever is higher.

Equities:
1. Stocks—typically $5+ to be marginable, long/short initial/maintenance are house specific.
2. Mutual funds—all marginable and rules are similar to stocks.
3. Indexes—similar to mutual funds.

Derivatives:
1. Stock options—long positions are not marginable, 25% underlier value for naked, 10% for deeply out of money naked, and margin breaks for recognized hedging positions.

Futures:
1. Futures—fixed dollar amount for depending on the contract; calendar and inter-commodity spreads receive margin credits depending on house rules.

Optional:
1. Other: Margined at 100% net liquidation value—default setting.

Cash and Equivalents

Cash balance (trade day balance) includes beginning cash position plus all payment and proceeds from longing and shorting securities. No margin is accessed on cash.

Money market funds and FX spot are margined based on margin rules similar to equity.

Equity Positions

Long Stock

Stock is purchased and cash is paid. Stocks with prices greater than or equal to $5 are marginable.

Examples:
1. Long marginable equity position (30% margin requirement)

Long 100 $C$ at \$35; $MMR=100*35*30\%=1050$

2. Long non-marginable equity position (100% margin requirement)

Long 100 LU at \$4; MMR=400

Marginable stock positions preferably are used as collateral to obtain margin loans. Non-marginable stock positions have no impact on account margin. The $5 cutoff on marginable stocks is configurable in AMPro. The 30% margin requirement in this example is configurable as an initial margin requirement or a maintenance margin requirement depending on whether it is an overnight position or a day position.

AMPro's margin rule management capability can handle more complex scenarios. A list of stocks may be created as the hard-to-borrow list so that they are not marginable. Although embodiments can handle all of the scenarios, a broker-dealer may need to create such a setup.

Short Stock

Stock is sold short and cash is received.

Examples:
1. Short marginable equity position (30% margin requirement)
ti Sell short 100 $C$ at \$35; $MMR=100*35*30\%=1050$
2. Short non-marginable equity position (100% margin requirement)

Sell short 100 LU at \$4; MMR=400

Cash proceeds are included in the cash balance, which in turn provides buying power, and market value is negative, which reduces buying power. Taking advantage of this offset, margin requirements on these positions are computed consistent with long positions. By the same token, the $5 cutoff and the 30% initial or maintenance margin requirements numbers are configurable in AMPro.

Stock Options

Risk-based margin for options preferably is designed to follow the following philosophy:
1. Option price (full premium) has two components: intrinsic value (in-the-money)+time premium.
2. Time premium is always required at 100%, as it will go away with time and volatility change.
3. If in-the-money, the intrinsic value provides a matching stock position with additional value for margining.
4. In case of an option-to-option matching, additional margin is required for maximum loss that may occur at the expiration date, based on an option payoff matrix.
5. Unlike SPAN or TIMS, the system of an embodiment does not automatically include stock volatility into its computation. However, broker dealer may research stocks on their own and set margin requirement based on a pattern matching on option roots.

Hybrid Stock Options

Hybrid stock options require the delivery of cash in addition to shares of stock on the settlement date. Corporate actions, including mergers & acquisitions and stock splits, give rise to these derivatives. To effectively calculate margin requirements on hybrid equity options, an effective strike price is required. The effective strike price is calculated as follows:

Effective Strike Price=(Strike−Cash Settlement)*Basis Value/Settlement Quantity

Default values: Cash Settlement (0), Settlement Quantity (100), and Basis Value (100)
Example:
Underlying Stock Symbol (Symbol1): TYC
Root Symbol (Root): TNY
Option Symbol (Ticker): TNYGC
Strike Price (Strike): 15.00
Cash Settlement per Share (Settlement Cash): 0.19050
Settlement Quantity/Lot Size (Shares): 31
Basis Value: 100

TNYGC Effective Strike Price=(15.00−0.19050)*100/31=47.77

Basis value will not always be 100. For example, a 3-for-2 stock split will change the basis value of the stock option to 150. (A 2-for-1 stock split will ordinarily increase the number of outstanding options by 2 and the basis value will remain 100). If Settlement Quantity=0, then the formula preferably is calculated without the settlement quantity:
** Use Effective Strike Price in All Calculations for 'Strike Price'
All of the following formulas take into consideration hybrid options.
Uncovered (Naked) Option
Long Option
An option is purchased and cash, its premium, is paid.
Example:
1. Long call option Long 1 C March 35 Call at $2; Margin=2*100=200

2. Long put option

Long 1 C March 35 Put at $2; Margin=200

Outright long option positions are margined at 100% of the premium. No AMPro margin rule is required, but AMPro can overwrite the built-in rules.
Uncovered (Naked) Short Options
An option is sold short and cash, the premium, is received.
Examples:
1. Short call option Short 1 C March 35 Call; Margin=ORQ calculation is specified in the ORQ Requirement 2. Short put option
Short 1 C March 35 Put; Margin=ORQ calculation is specified in the ORQ Requirement
Following is a description of the algorithms.
A) if the options are deeply out-of-money (minimum requirements):
10% of the underline stock plus 100% of premium. For instance, if C is trading at 20, situation 1) will require $200 plus the time premium
B) otherwise (normal naked requirements)
25% of the underline stock plus 100% of premium. For instance, if C is trading at 36, in 1) $900 plus the time premium is required.
C) for deeply in the money options:
If the intrinsic value (in-the-money value) is greater than B, the full premium is required. (Full premium=market price=In-The-Money+time premium). For instance, if C is trading at 50 while March 35 Call is trading at 16, the full 1600 premium is required. (Because ITM=15>25%*50.)

The 10% deeply out-of-money option requirement and the 25% option requirement are both configurable in AMPro margin rules.
Covered Option
Covered Write Call
Stock is purchased and a call is sold.
1. In-the-money short call covered by marginable long stock.

Short 1 C March 32.5 Call@$3.5; Margin=time premium=100

Long 100 C at $35; Margin=30%*32.5*100=975

2. In-the-money short call covered by non-marginable long stock.

Short 1 LU March 3.5 Call@$1; Margin=time premium=50

Long 100 LU at $4; Margin=100%*3.5*100=350

3. Out-of-money short call covered by marginable long stock.

Short 1 C March 32.5 Call@$1; Margin=time premium=full premium=100

Long100 C at $30; Margin=30%*30*100=900

No margin rule is required in AMPro.
Covered Write Put
Stock is sold short and a put is sold.
1. In-the-money short put covered by marginable short stock.

Short 1 C March 32.5 Put@$3.5; Margin=time premium=100

Short 100 C at $30; Margin=30%*32.5*100=975

2. In-the-money short put covered by non-marginable short stock.

Short 1 LU March 4.5 Put@$1; Margin=time premium=50

Short 100 LU at $4; Margin=450(Some house rules require $500 as minimum)

3. 3) Out-of-money short put covered by marginable short stock.

Short 1 C March 32.5 Put@$0.5; Margin=time premium=50

Short 100 C at $35; Margin=30%*35*100=1050

No margin rule is required in AMPro.
Synthetic Put (Short Hedge—Married Call)
Stock is shorted and a call is purchased to cover the short stock.
Examples:
1. Marginable short stock and in-the-money long call.

Short 100 C at $35; Margin=30%*32.5*100=975

Long 1 C March 32.5 Call@$3; Margin=time premium=50

2. Non-marginable short stock and in-the-money long call.

Short 100 LU at $4; Margin=100%*3.5*100=350

Long 1 LU March 3.5 Call@$1; Margin=time premium=50

3. Short stock and out-of-money long call.

Short 100 C at $30; Margin=900 (as if no cover)

Long 1 C March 32.5 Call@$1; Margin=time premium=full premium=100

In a synthetic put, a long in-the-money option position provides a margin credit to offset the short stock position's margin requirements. Therefore, a short stock position's margin requirement is based on the strike price of the option rather than the stock's market price. In the meantime, the intrinsic value of the option provides margin relief to the portfolio. No margin rule is required in AMPro.

Synthetic Call (Long Hedge—Married Put)

Stock is bought and a put is purchased. No specific algorithm is required, as this is a non-conventional trading strategy. The following example is to illustrate an algorithm that may be used.

Examples:
1. Marginable long stock and in-the-money long put.

Long 100 C at $30; Margin=30%*32.5*100=975

Long 1 C March 32.5 Put@3; Margin=time premium=50

2. Non-marginable long stock and in-the-money long put.

Long 100 LU at $4; Margin=100%*5*100=500

Long 1 LU March 5 Put@$1.5; Margin=50

3. Long stock and out-of-money long put.

Long 100 C at $35; Margin=30%*35*100=1050

Long 1 C March 32.5 Put@$0.5; Margin=full premium=50

In a synthetic call, a long in-the-money put position provides additional margin as it extends the value of the combination beyond the stock's market value even if the stock price drops. Therefore, the margin requirements are computed on the strike price of the option rather than the stock's market price. In the meantime, the intrinsic value of the option provides margin relief to the portfolio. No margin rule is required in AMPro.

Straddle

Long Straddle

A put and a call with the same underlying stock, strike price, and expiration date are bought together. No specific algorithm is required for this strategy. The long straddle may be treated as two unrelated long option positions, thus their premium is traded as the margin requirement.

Example:
1. Long put and call.
C trading at 35

Long 1 C March 32.5 Call; Margin=premium

Long 1 C March 32.5 Put; Margin=premium

When the stock stays at 32.5 on expiration, both options will have a value of 0. Thus, the maximum loss can be their market value, and the margin requirement should be set so. No margin rule is required in AMPro.

Short Straddle

A put and a call with the same underlying stock, strike price, and expiration date are sold together.

Example:
1. Short put and call
C trading at 35

Short 1 C March 37.5 Call; Margin=0

Short 1 C March 37.5 Put; Margin=ORQ Naked

The straddle structure guarantees that only one side of the straddle will have a down side risk at any time. Thus, the margin requirement is the naked ORQ on the leg that is in the money. No margin rule is required in AMPro.

Calendar Spread

Long Calendar Spread

An option is sold, and the same type option with the same underlying symbol, strike price, and LONGER expiration date is bought.

1. Long Call Calendar Spread

Short 1 C March 35 Call; Margin=the difference of the pair's market value (premium).

Long 1 C June 35 Call; Margin=0

2. Long Put Calendar Spread

Short 1 C March 35 Put; Margin=the difference of the pair's market value (premium).

Long 1 C June 35 Put; Margin=0

Before the expiration of either option in a calendar spread, their risk is perfectly hedged. No additional margin is required for the short. However, the net market value of the pair is withheld as they may go away with time. After the first option expires, the account ends up with a long position of the remaining option and the long side of the premium becomes the margin requirement.

Short Calendar Spread

An option is bought, and the same type of option with the same underlying symbol, same strike price, and LONGER expiration date is sold.

1. Short Call Calendar Spread

Long 1 C March 35 Call; Margin=0

Short 1 C June 35 Call; Margin=Naked ORQ

2. Short Put Calendar Spread

Long 1 C March 35 Put; Margin=0

Short 1 C June 35 Put; Margin=Naked ORQ

Before the expiration of either option in a calendar spread, their risk is perfectly hedged. After the first option expires, the account ends up with an uncovered short position of the remaining option. Thus, margin must be assessed to address the risk.

Under the current ORQ Requirement, this type of spread is NOT recognized as a spread. Thus, the short position is considered naked, taking the most conservative approach.

Bear/Bull Spread

A pair of options of the same type with the same underlying stock and expiration date are longed and shorted, respectively.

1. Bear Call Spread

Long C March 37.5 Call

Short C March 32.5 Call

2. Bear Put Spread

Long C March 37.5 Put

Short C March 32.5 Put

3. Bull Call Spread

Long C March 32.5 Call

Short C March 37.5 Call

4. Bull Put Spread

Long C March 32.5 Put

Short C March 37.5 Put

The maximum loss for the BEAR Spread strategy is the difference of the strike prices, which is the ceiling for its ORQ. If the difference between their strike prices is greater than the ORQ for the naked option, the naked ORQ should be used. There should be no downside risk for a BULL spread. This part of the requirement addresses the maximum loss upon expiration.

In the meantime, the difference in time premium is required in addition.

Strangle
Long Strangle

A long strangle is an option strategy in which an out-of-the-money call and an out-of-the-money put of the same month and stock are purchased. Margin is the full premium paid. No specific algorithms.

Short Strangle

A short strangle is an option strategy in which an out-of-the-money call and an out-of-the-money put of the same month and stock are sold. ORQ should be the same as a short straddle.

Butterfly
Long Butterfly

Long butterfly will never lose money upon expiration. Thus, no additional margin requirement will be accessed. However, it can and will lose its time premium while it approaches expiration. Thus the margin requirement is the net sum of time premium of each position.

Example:
XYZ trading at 49

Long 1 XYZ June Call@45 Price=5: Time premium=100

Short 2 XYZ June Call@50 Price=1: Time premium=−100*2=−200

Long 1 XYZ June Call (55 Price=0.5: Time premium=50

Margin Requirement=|100−200+50|=50

Note: Time premium=Full premium (price)−Intrinsic Value (In-The-Money)

Short Butterfly

The margin requirement for a long butterfly is the net premium paid. The margin requirement for a short butterfly is the difference of the lower two strikes. The premium received from a short butterfly may be applied to meet the margin requirement. This is based on the following payoff table (Table 5), which assumes that the left wing has the lowest strike price.

TABLE 5

| Payoff Table (Stock Price) | Long Butterfly | Short Butterfly |
|---|---|---|
| Stock Price <= Left Strike | 0 | 0 |
| Left Strike < Stock Price <= Body Strike | Stock Price − Left Strike (+) | Left Strike − Stock Price (−) |
| Body Strike < Stock Price <= Right Strike | Right Strike − Stock Price (+) | Stock Price − Right Strike (−) |
| Right Strike < Stock Price | 0 | 0 |

It is clear that the maximum loss on a short butterfly is the difference of the lower two strike prices (i.e. the margin requirement for short butterfly). In addition, the net different of time premiums is required for both long and short butterflies.

Example:
XYZ trading at 49

Short 1 XYZ June Call@45 Price=5: Time premium=100

Long 2 XYZ June Call (50 Price=1: Time premium=−100*2=−200

Short 1 XYZ June Call (55 Price=0.5: Time premium=50

Margin Requirement=|100−200+50|+(50−45)*100=550

Note: Time premium=Full premium (price)−Intrinsic Value (In-The-Money)

Asymmetric Butterfly

An asymmetric butterfly has two different sized wings, balanced by the opposite difference in strike prices. This strategy has no specific algorithm and is processed as two separate spreads. An example:

Long 5 June 40 Call of XYZ

Short 10 June 45 Call of XYZ

Long 10 June 47.5 Call of XYZ

Other Spreads

If a spread is neither a calendar spread nor a bull/bear spread, the following generic formula applies:

|Short Strike Price−Long Strike Price|×Short Settlement Quantity×Short Number of Contracts    Formula A Long Market Value of the Spread−Short Market Value of the Spread    Formula B The margin requirement for the spread is the greater of the two.

Collar

A collar is an option strategy in which stock is purchased, an out-of-the-money call is sold, and an out-of-the-money put is purchased. No specific algorithm for this strategy. All positions are processed independently.

Conversion

Treated as covered call.

Reversal

Treated as naked put.

Futures

Futures margin requirements are governed by two sets of setup options: AMPro margin requirements for outright, and file-based parameters for spreads.

All margin requirement features in AMPro are available for futures. As a general practice, single stock futures requirements typically are set up as a percentage of the contract value, say 20%. Other future contracts typically are set up as fixed amount. In many cases, a regular expression pattern matching can be applied to the symbols. These rules are house rules. If the broker-dealer wants to use exchange default rules, they must request TAL to set up the house rule identical to exchange rules.

A file containing future spread match parameters is required to process future spreads. Following is an example of a typical file:

TABLE 6

| Root1 | Root2 | Months | Ratio | Release | Remark |
|---|---|---|---|---|---|
| /ES | | 3; 6; 9; 12 | | 95 | E-mini S&P 500 |
| /NQ | | 3; 6; 9; 12 | | 95 | E-mini NASDAQ-100 |
| /GE | | | | 85 | Eurodollar |
| /GLB | | | | 85 | 1 Month LIBOR |
| /S | | 1; 3; 5; 7; 8; 9; 11 | | 80 | Soybeans |
| /BO | | 1; 3; 5; 7; 8; 9; 10; 12 | | 75 | Soybean Oil |
| /FDAX.EUX | | | | 95 | DAX Index |
| /L.LIF | | | | 90 | Short Sterling |
| /ES | /NQ | | 0.5 | 85 | |
| /ES | /ER2 | | 1 | 85 | |
| /NQ | /EMD | | 1.5 | 85 | |
| /NQ | /ER2 | | 2 | 85 | |
| /SM | /BO | | 0.6667 | 50 | |
| /FESX.EUX | /FDAX.EUX | | 2.5 | 70 | |
| /L.LIF | /I.LIF | | 1.3333 | 50 | |
| /FGBL.EUX | /FGBM.EUX | | 1 | 90 | |

Root1: Required field. For calendar spreads, it is the root symbol for both legs. For inter-commodity spreads, it is the root of the first leg.

Root2: Required field for inter-commodity spread. It is the root for the second leg of an inter-commodity spread. Blank for calendar spread.

Months: Blank for inter-commodity spreads. For calendar spreads, if left blank, it means all months. It is a semicolon-delimited list of month numbers that can form a calendar spread.

Ratio: If left blank, it means a default of 1. This is the ratio between the contract numbers of the two legs in a spread.

Release: Required field 0-100. This is the percentage of outright margin requirement to credit back when a spread is determined.

Remark: Optional field that can contain any string for documentation purposes.

Outright Futures

An outright position can be long or short on a number of contracts. AMPro contains a set of rules (Margin Rule Set) governing the margining. The lookup algorithm is detailed in the AMPro User Manual. Here is a summary:

Example: Long 10/ESH5

1. The rule set must set to security type 3—Futures, and,

2. Exact match: If the rule with/ESH5 tag is found, it will be applied. Otherwise, 3. Commodity pattern: If the rule with /ES* tag is found, it will be applied. Otherwise, 4. Date pattern: If the rule with /*H5 tag is found, it will be applied. Otherwise, 5. Blanket pattern: If the rule with /* tag is found, it will be applied. Otherwise, 6. Full contract value will be charged.

If a rule is found, it will say if it is a fixed amount or a percentage of the contract value. The outright requirement will thus be computed.

Calendar Spreads

To illustrate the algorithm, the following positions are assumed:

Long 3/ESH5

Short 2/ESM5

Assume the margin rule says: IMR for /ESH5 is 1000. IMR for /ESM5 is 1100.

Calendar spread rule found:

TABLE 7

| /ES | 3; 6; 9; 12 | 95 | E-mini S&P 500 |
|---|---|---|---|

Thus, the positions are computed as follows:

Long 2/$ESH$5: spread margin=1000*2*(1-95%)=100

Short 2/$ESM$5: spread margin=1100*2*(1-95%)=110

Long 1/ESH5: outright margin=1000

Total margin=1210

Inter-Commodity Spreads

To illustrate the algorithm, the following positions are assumed:

Long 8/ESH5

Short 10/NQH5

Assume the margin rule says: IMR for /ESH5 is 1000. IMR for /NQH5 is 600.

Inter-commodity spread rule found:

TABLE 8

| /ES | /NQ | 0.5 | 85 |
|---|---|---|---|

Thus, the positions are computed as follows:

Long 5/$ESH$5: spread margin=1000*5*(1-85%)=750

Short 10/$NQH$5: spread margin=600*10*(1-85%)=900

Long 3/ESH5: outright margin=3000

Total margin=4650

Other Business Rules
Pending Orders

Pending orders are orders that are submitted to the trading system but not yet filled. Limited orders are the most common form of pending orders. The following example illustrates how the system deals with pending orders.
Cash 3200

Long 100 XYZ@100–Limit price=98: Margin=30%*98*100=2940

Buying power=3200−2940=260 OK

If a pending order is (1) an stock, bond, mutual fund, and index, and (2) the limited price is within 5% of the market price, it can be used to cover other derivative positions. For instance,
Cash 5000

Long 100 XYZ@100–Limit price=98: Margin=30%*98*100=2940

Short 1 XYZ Call@100–market order at $2: Covered margin=200

Buying power=3200−2940−200=60

If the pending XYZ buy I executed, the following positions are safe.
Cash −6600

Long 100 XYZ@98: Margin=30%*98*100=2940

Short 1 XYZ Call@100 price=$2: Covered margin=200

Buying power=(−6600+9800)−2940−200=60 OK

If the pending XYZ buy is not executed due to cancellation, the following positions also are safe:
Cash 3200
XYZ trading at 100

Short 1 XYZ Call@100 price=$2: Naked margin=25%*100*100+200=2700

Buying power=3200−2700=500 OK

If the pending order is not an equity order, or the limited price is more than 5% away from the market price, it cannot be used to cover other positions. The following two examples illustrate the scenarios:
Cash 2000

Long 100 XYZ@(100–Limit price=50: Margin=30%*50*100=1500

Short 1 XYZ Call@100–market order at $2

If a cover is allowed, the short call will be charged 200 margin and the trade would go through. Then, after the buy XYZ order is canceled, we have:
Cash 2000
XYZ trading at 100

Short 1 XYZ Call@100 price=$2: Naked margin=25%*100*100+200=2700

Buying power=2000−2700=−700 Bad–margin call

Therefore, the following computation is required so that the short option order is rejected:
Cash 2000

Long 100 XYZ@100–Limit price=50: Margin=30%*50*100=1500

Short 1 XYZ Call@100–market order at $2: Naked margin=2700

Buying power=2000−1500−2700=−2200 Bad–reject

Similarly, the following example illustrates that pending option trades cannot be considered a cover:
Cash 2000

Long 1 XYZ Call@100–limit price=$1,market price=$2: Margin=100

Short 1 XYZ Call@100–market order at $2: Naked margin=2700

Buying power=2000−100−2700=−800 Bad–reject

The reason for not allowing the long call limited order to be a cover is apparent. If it is canceled in the future, the account will not be in good standing.

There is one exception to the above rules. If an order is determined to liquidate an existing position, it will have a zero margin charge.

Compound Orders

The following four types of compound orders are supported in an embodiment:

1. Order Cancel Order: A group of orders are submitted together; one of the orders is executed, and the rest of the orders are canceled. Margin requirement for this type of compound is the greatest margin requirement of individual orders.

2. Order Trigger Order (Sequential Order): A group of orders is submitted and one order goes live. When the live order is executed, it triggers another order, etc., until all orders are executed. User can cancel any pending order before it is executed. The margin requirement for this order is the greatest margin requirement for the sequence of executions.

3. All or None: A group of orders is submitted. The lead order is a limit or market order, and all other orders are conditional market orders that are triggered only when the lead order is executed. Therefore, either all orders are executed or none of them are executed. The margin requirement of this type is the overall margin requirement for the group.

4. Basket Orders. A group of independent orders is submitted. Margin is computed as if they are submitted one by one. However, if the account buying power is insufficient, the entire basket is rejected. An embodiment will not allow partial submission of the basket.

Currency Conversion

Currency conversion is fully handled. Each user account has a Home Currency. Each security has a Quoted Currency on its real-time price. In an embodiment, all other currency specifications, especially in the AMPro margin rules, are overwritten with these two currency figures. Thus, all margin and risk calculations are conducted on the Home Currency, while an exchange rate is applied if the security is quoted in a different currency. The exchange rates preferably applied are overnight exchange rates. However, this may be modified to, e.g., 10 minute refreshes.

Optimization

An objective of risk-based margin is to achieve the lowest possible margin requirement for a portfolio. While every effort is made, there is no way to guarantee that the optimum is achieved. In complex cases, to achieve the optimal low margin requirements requires significant computing power—not feasible for a real-time application. However, an embodiment should achieve an optimal margin requirement in most cases, and "good enough" requirements in highly complex cases. The following is the high-level pseudo code.

1. Divide a portfolio into two parts: (a) stock and option part (b) futures part.
2. Divide stock and option part into groups by underlier.
3. Each position in the underlier group is matched with other position to look for match for
   a) Box spreads
   b) Long butterfly
   c) Short butterfly
   d) Spreads
   e) Covers
   f) Straddles
   g) Hedges
   h) Nakeds
4. Divide future positions into groups by root.
5. For each root group, match one position to another to form Calendar Spreads.
6. Match each futures position to another to form Inter-Commodity Spreads.
7. Sum up margins.

Portfolio Manager

Portfolio Manager is a GUI dialog box used in an embodiment (Risk Analyzer). It allows a user to define portfolios of investment positions by arbitrarily pulling together accounts predefined in an account hierarchy. RiskAnalyzer can then produce Value-at-Risk reports using the portfolio definitions.

Because a typical account hierarchy contains thousands of items, a challenge is to allow a user to select and remove many items from a large and complex tree structure without getting lost through browsing.

The Portfolio Manager preferably comprises two main components: (1) a tree control with checkboxes for an entire account hierarchy; and (2) a grid control of applicable hierarchy properties for selected items. When an item is selected in the tree control, it is added to the grid with its hierarchical properties. When an item is selected in the grid, an instant search is performed on the tree control and a corresponding item is displayed to user.

The following is an illustrative example:

(1) Left pane 110 contains a large tree structure with many levels. See FIG. 1.

Figure 2:
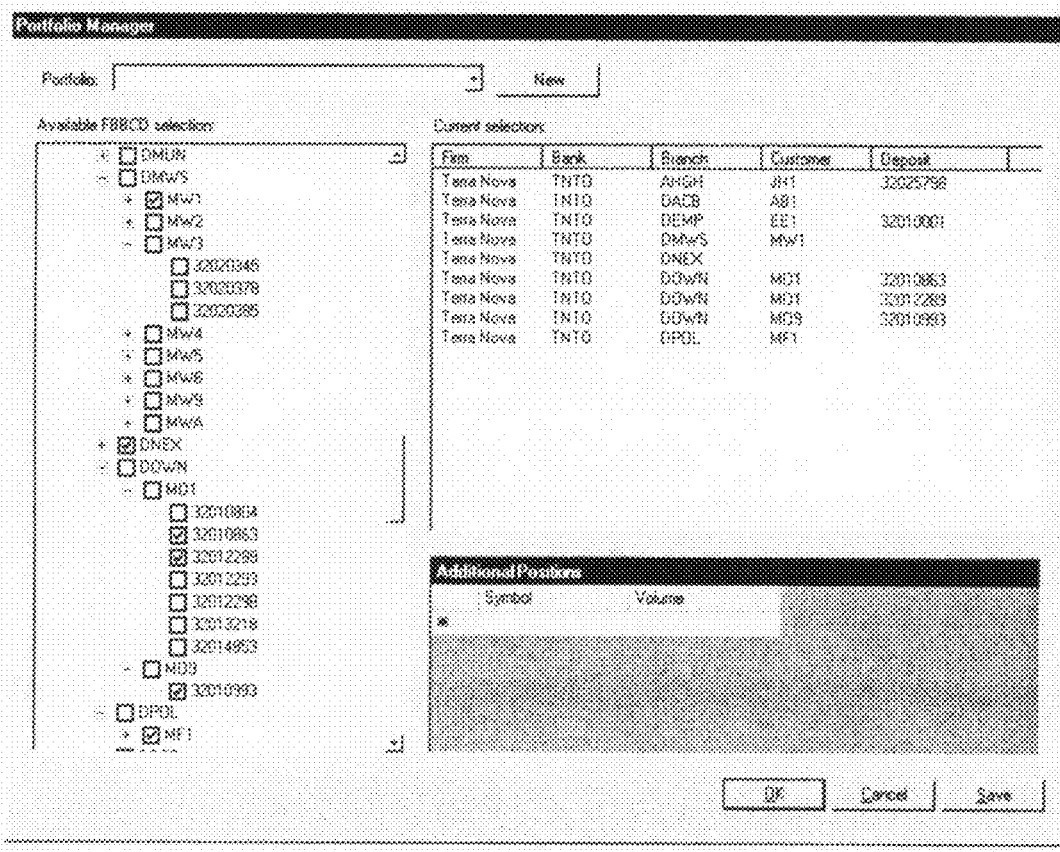
FIG. 2 depicts a preferred GUI including a populated grid.

(2) While navigating within the tree in left pane 110, user selects items via the checkboxes 120. Each selected item is added to the right side grid 130 for easy viewing. User can easily lose his view of all checked items on the left because the tree structure is so large. See FIG. 2.

Figure 3:
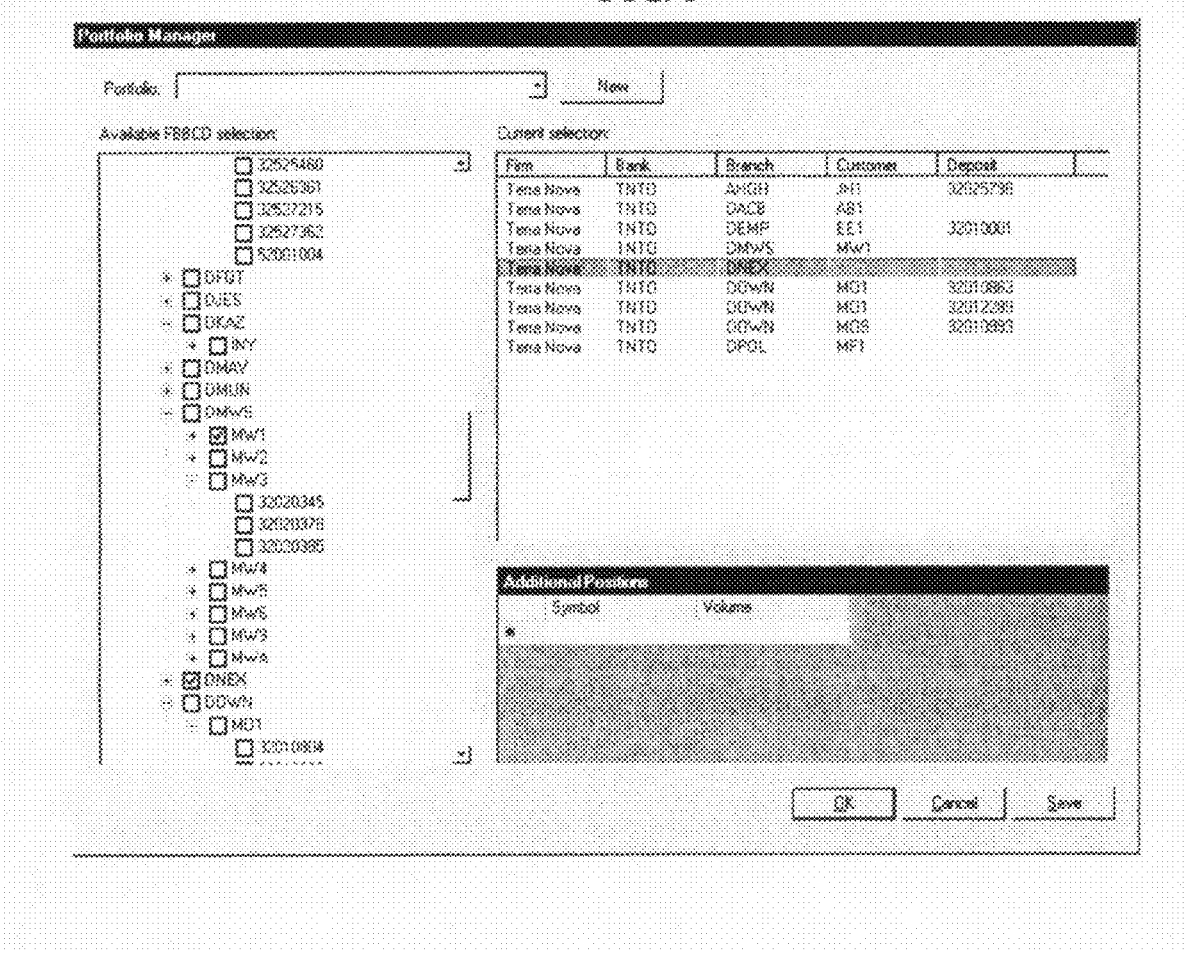
FIG. 3 depicts a preferred GUI illustrating navigation facilitated by the grid.

3) Each time the user clicks a row on the right grid 130, the software will instantly find the corresponding item on the tree structure in left pane 110 and take the user there. This way, the user doesn't need to browse through the large tree structure again to find selected items. See FIG. 3.

It will be appreciated that the present invention has been described by way of example only and with reference to the accompanying drawings, and that improvements and modifications may be made to the invention without departing from the scope or spirit thereof.

What is claimed is:

1. A computer implemented method comprising:
   acquiring background data regarding securities positions and regarding real-time pricing data;
   performing, by a computer, calculations regarding intermediate measures of performance of said securities;
   receiving at least one request comprising a request for a value at risk report regarding said securities;
   calculating, by a computer, before the end of a current trading day, an estimated whole day volatility for the current trading day for at least one of said securities, wherein said estimated whole day volatility (V) calculation comprises calculating a Parkinson's volatility estimation of daily volatility based on an intra-period high and low during the current trading day and based on a $\sqrt{T}$ rule, wherein the $\sqrt{T}$ rule refers to, given a standard deviation for a period, a standard deviation for T periods being estimated as equal to $\sqrt{T}$ multiplied by said standard deviation for said period; and
   providing, by a computer, a value at risk report based on said background data, said intermediate measures, said estimated whole day volatility, and Parkinson's volatility estimation, wherein said estimated whole day volatility (V) is calculated using $$V = \sqrt{\frac{TD}{T0}} \frac{1}{2\sqrt{\ln 2}} \ln \frac{H}{L},$$

wherein H is the intra-period high, L is the intra-period low, $T_D$ is the total time of the current trading day, and $T_0$ is the time period that has lapsed since the security started its trading for the current trading day.

2. A method as in claim 1, wherein said step of acquiring background data comprises obtaining real-time data regarding positions from one or more order management systems.

3. A method as in claim 1, wherein said step of acquiring background data comprises obtaining real-time pricing data from one or more market data services.

4. A method as in claim 1, wherein said step of acquiring background data comprises obtaining high-low volatility data based on a plurality of recent trading days.

5. A method as in claim 4, wherein said plurality of recent trading days is ten days.

6. A method as in claim 1, wherein said step of performing calculations regarding intermediate measures of performance of said securities comprises computing implied volatility for options based on a Black-Scholes formula and market prices.

7. A method as in claim 1, wherein said step of performing calculations regarding intermediate measures of performance of said securities comprises computing multi-point risk arrays based on option implied volatility and stock high-low volatility.

8. A method as in claim 1, wherein intermediate measures of performance comprise positions, volatilities, and risk arrays.

9. A method as in claim 8, wherein said step of providing a value at risk report comprises grouping positions by underlying securities.

10. A method as in claim 9, wherein said step of providing a value at risk report comprises aggregating risk arrays for positions in the same group.

11. A method as in claim 10, wherein said step of providing a value at risk report comprises aggregating risk arrays for positions within each of one or more groups based on correlation coefficients between different groups.

12. A method as in claim 1, wherein said step of providing a value at risk report comprises transmitting said report to a graphical user interface for display.

13. A computer readable storage medium storing instructions executable by a processor, which when executed, cause the computer to perform a method comprising:

acquiring background data regarding securities positions and regarding real-time pricing data;

calculating intermediate measures of performance of said securities;

receiving at least one data request comprising a request for a value at risk report regarding said securities;

calculating, before the end of a current trading day, an estimated whole day volatility for the current trading day for at least one of said securities, wherein said estimated whole day volatility (V) calculation comprises calculating a Parkinson's volatility estimation of daily volatility based on an intra-period high and low during the current trading day and based on a $\sqrt{T}$ rule, wherein the $\sqrt{T}$ rule refers to, given a standard deviation for a period, a standard deviation for T periods being estimated as equal to $\sqrt{T}$ multiplied by said standard deviation for said period; and providing a value at risk report based on said background data, said intermediate measures, said estimated whole day volatility, and Parkinson's volatility estimation, wherein said estimated whole day volatility (V) is calculated using, $$V = \sqrt{\frac{T_D}{T_0}} \frac{1}{2\sqrt{\ln 2}} \ln \frac{H}{L}$$

wherein H is the intra-period high, L is the intra-period low, $T_D$ is the total time of the current trading day, and $T_0$ is the time period that has lapsed since the security started its trading for the current trading day.

14. A computer readable storage medium as in claim 13, wherein acquiring background data comprises obtaining real-time data regarding positions from one or more order management systems.

15. A computer readable storage medium as in claim 13, wherein acquiring background data comprises obtaining real-time pricing data from one or more market data services.

16. A computer readable storage medium as in claim 13, wherein acquiring background data comprises obtaining high-low volatility data based on a plurality of recent trading days.

17. A computer readable storage medium as in claim 16, wherein said plurality of recent trading days is ten days.

18. A computer readable storage medium as in claim 13, wherein calculating intermediate measures of performance of said securities comprises computing implied volatility for options based on a Black-Scholes formula and market prices.

19. A computer readable storage medium as in claim 13, wherein calculating intermediate measures of performance of said securities comprises computing multi-point risk arrays based on option implied volatility and stock high-low volatility.

20. A computer readable storage medium as in claim 13, wherein intermediate measures of performance comprise positions, volatilities, and risk arrays.

21. A computer readable storage medium as in claim 20, wherein providing a value at risk report comprises grouping positions by underlying securities.

22. A computer readable storage medium as in claim 21, wherein providing a value at risk report comprises aggregating risk arrays for positions in the same group.

23. A computer readable storage medium as in claim 22, wherein providing a value at risk report comprises aggregating risk arrays for positions within each of one or more groups based on correlation coefficients between different groups.

24. A computer readable storage medium as in claim 13, wherein providing a value at risk report comprises transmitting said report to a graphical user interface for display.

25. A method as in claim 8, wherein for each of one or more positions, one or more elements of a corresponding risk array are computed based on a product of price, volume, and risk array elements for the security in which the position is held.

26. A method as in claim 11, wherein said correlation coefficients comprise zero correlation for assets in different asset classes.

27. A method as in claim 26, wherein said correlation coefficients comprise correlation of 0.5 for assets within an asset class.

28. A method as in claim 27, wherein said correlation coefficients comprise high correlation for assets with the same underliers.

29. A method as in claim 1, wherein said Parkinson's volatility approximation of daily volatility is further based on Parkinson's volatility estimates for prior days.

30. A computer readable storage medium as in claim 20, wherein for each of one or more positions, one or more elements of a corresponding risk array are computed based on a product of price, volume, and risk array elements for the security in which the position is held.

31. A computer readable storage medium as in claim 23, wherein said correlation coefficients comprise zero correlation for assets in different asset classes.

32. A computer readable storage medium as in claim 31, wherein said correlation coefficients comprise correlation of 0.5 for assets within an asset class.

33. A computer readable storage medium as in claim 32, wherein said correlation coefficients comprise high correlation for assets with the same underliers.

34. A computer readable storage medium as in claim 13, wherein said Parkinson's volatility approximation of daily volatility is further based on Parkinson's volatility estimates for prior days.

* * * * *